(12) United States Patent
Fairhurst et al.

(10) Patent No.: US 7,669,007 B2
(45) Date of Patent: Feb. 23, 2010

(54) MIRRORED REDUNDANT ARRAY OF INDEPENDENT DISKS (RAID) RANDOM ACCESS PERFORMANCE ENHANCEMENT

(75) Inventors: Matthew John Fairhurst, Winchester (GB); Robert Akira Kubo, Tucson, AZ (US); Jeremy Michael Pinson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/619,987

(22) Filed: Jan. 4, 2007

(65) Prior Publication Data

US 2008/0168222 A1    Jul. 10, 2008

(51) Int. Cl.
*G06F 13/00* (2006.01)
*G06F 13/28* (2006.01)

(52) U.S. Cl. ............... 711/114; 711/154; 711/161; 711/162

(58) Field of Classification Search ........... 711/114, 711/161–162, 154
See application file for complete search history.

(56) References Cited

U.S. PATENT DOCUMENTS

| | | | |
|---|---|---|---|
| 5,633,999 A | 5/1997 | Clowes et al. | |
| 6,321,298 B1 | 11/2001 | Hubis | |
| 6,397,348 B1 | 5/2002 | Styczinski | |
| 6,484,235 B1 * | 11/2002 | Horst et al. | 711/114 |
| 2003/0056142 A1 | 3/2003 | Hashemi | |
| 2004/0250029 A1 * | 12/2004 | Ji et al. | 711/162 |
| 2005/0216660 A1 | 9/2005 | Kobayashi et al. | |
| 2005/0246579 A1 | 11/2005 | Rust et al. | |

OTHER PUBLICATIONS

U.S. Patent application entitled "Data Storage Control Apparatus and Method", U.S. Appl. No. 11/462,199, filed Aug. 3, 2006 by inventors D.S. Critchley, R.H. Hopkins, and J.I. Settle.

* cited by examiner

*Primary Examiner*—Sanjiv Shah
*Assistant Examiner*—Yaima Campos
(74) *Attorney, Agent, or Firm*—Janaki K. Davda; Konrad Raynes & Victor LLP

(57) ABSTRACT

Provided are techniques for processing read and write request operations. Regions of a first storage device and a second storage device are designated as primary regions and secondary regions for read request operations and write request operations falling within the regions. At least one write request operation is processed. Upon determining that a write threshold has been reached, the designations of regions of the first storage device and the second storage device are switched.

15 Claims, 5 Drawing Sheets

MIRRORED REDUNDANT ARRAY OF INDEPENDENT DISKS (RAID) RANDOM ACCESS PERFORMANCE ENHANCEMENT

BACKGROUND

1. Field

Embodiments of the invention relate to mirrored Redundant Array of Independent Disks (RAID) random access performance enhancement.

2. Description of the Related Art

Computing systems often include one or more host computers ("hosts") for processing data and running application programs, storage for storing data, and a storage controller for controlling the transfer of data between the hosts and the storage. The storage may include mirrored Redundant Array of Independent Disks (RAID) storage devices. Storage controllers, also referred to as control units or storage directors, manage access to the mirrored RAID storage devices, which are comprised of numerous Hard Disk Drives (HDD) that maintain redundant copies of data (i.e., "mirror" the data). A storage controller may be described as a mechanism for managing access to a hard drive for read and write request operations, and a hard drive may be described as a storage device. Hosts may communicate Input/Output (I/O) requests to the storage space through the storage controller.

Conventional techniques send read and write request operations to each of two mirrored RAID storage devices. This is inefficient.

Thus, there is a need in the art for improved mirrored RAID random access performance by managing read and write request operations.

SUMMARY OF EMBODIMENTS OF THE INVENTION

Provided are a method, computer program product, and system for processing read and write request operations.

Regions of a first storage device and a second storage device are designated as primary regions and secondary regions for read request operations and write request operations falling within the regions. At least one write request operation is processed. Upon determining that a write threshold has been reached, the designations of regions of the first storage device and the second storage device are switched.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide read and write optimization for mirrored storage devices such that the overall performance of the mirrored storage devices is managed to an optimum.

Figure 1:
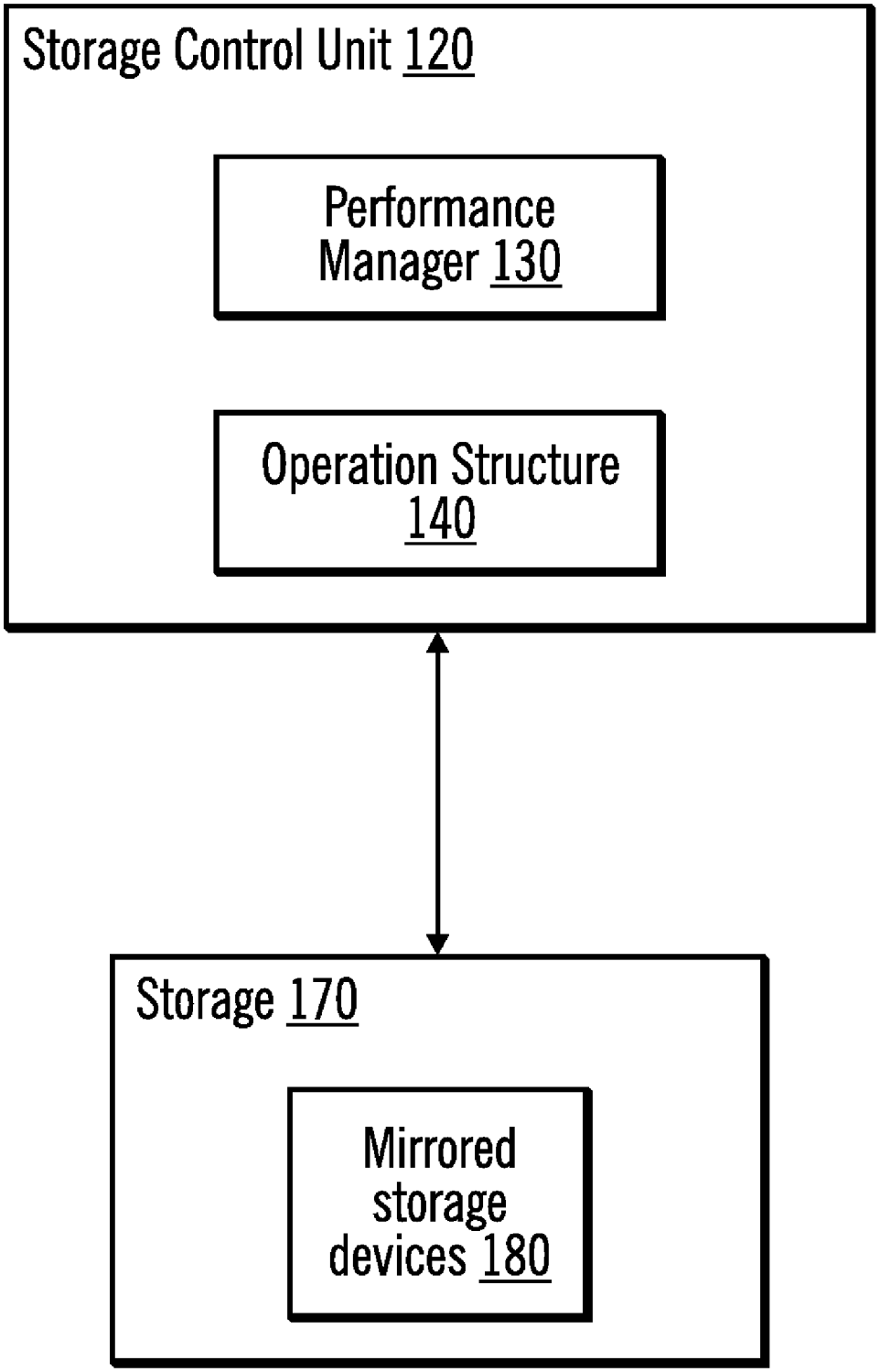
FIG. 1 illustrates details of a computing system in accordance with certain embodiments.

FIG. 1 illustrates details of a computing system in accordance with certain embodiments. The storage control unit 120 includes a performance manager 130 and one or more operation structures 140. The storage control unit 120 is coupled to storage 170. The storage 170 includes mirrored storage devices 180, such as mirrored RAID storage devices. The storage 170 may comprise an array of storage devices, such as Direct Access Storage devices (DASDs), Just a Bunch of Disks (JBOD), Redundant Array of Independent Disks (RAID), virtualization storage device, etc.

Figure 2:
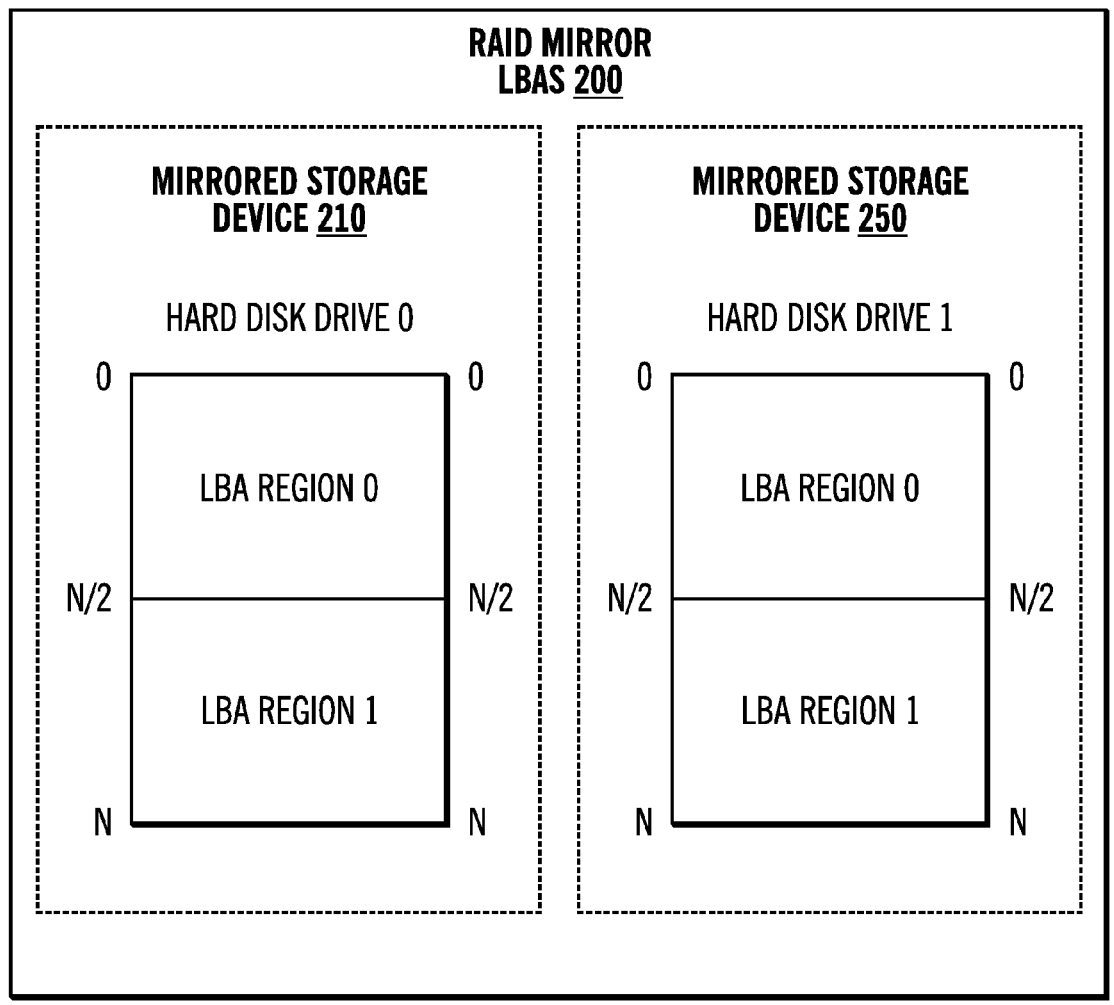
FIG. 2 illustrates a data layout for a mirrored pair of storage devices configured in a RAID array configuration in accordance with certain embodiments.

FIG. 2 illustrates a data layout for a mirrored pair of storage devices configured in a RAID array configuration in accordance with certain embodiments. The data layout is configured with the Logical Block Address (LBA) scheme of the RAID array configuration and the physical storage devices 210, 250 linearly mapped to each other. Logical block addressing may be described as an addressing scheme that enables a computer to address a hard disk. For example, a logical block address may be a 28-bit value that maps to a specific cylinder-head-sector address on the hard disk. Both the RAID array logical and storage device physical LBAs are mapped linearly from the top to the bottom of the range of the logical and physical storage devices.

Using FIG. 2 as a reference, the following example provides a description of embodiments of the invention. The RAID array configuration 200 includes mirrored storage device 210 and mirrored storage device 250. In this example, mirrored storage device 210 is a Hard Disk Drive (HDD0), and mirrored storage device 250 is a Hard Disk Drive (HDD1). HDD0 and HDD1 are each divided into two LBA regions (LBA region 0 and LBA region 1). HDD0 and HDD1 each have a read/write head that is moved to a particular LBA in response to read and write request operations.

The read request operations to each storage device 210, 250 are limited to orthogonal regions such that the read/write head travel is limited to a single region. For example, read request operations for LBA region 0 are issued to HDD0, while read request operations for LBA region 1 are sent to HDD1. The term "orthogonal" is used to describe that the regions are independent relative to each other (i.e., one region may be used without consideration as to how its use will affect the other region). By managing the storage device read/write head travel, the seek time for each read request operation is constrained to a finite value that is smaller than if an indiscriminate read/write head travel was promoted on each storage device for read request operations.

Embodiments link control and management of read request operations and write request operations to minimize the overall travel of the storage device read/write heads. Embodiments leverage the practice of controlling the storage device read/write head travel to a region of a storage device by limiting the read and write request operations sent to a primary LBA region on a primary storage device and batching the write request operations to the secondary LBA region on a secondary storage device to a write threshold. Once the write threshold is reached, the write request operations are ordered and sent to the storage device in an order that optimizes the motion of the storage device read/write head. Simultaneously with the initiation of the write request operations to secondary LBA regions of the storage device, the secondary region is made the primary LBA region of the storage device for read request operations. A write threshold may be described as a pending number of outstanding write operations (e.g., total to a RAID array, to a storage device, or some other combination) or the expiration of a write operation latency timer.

Figure 3A:
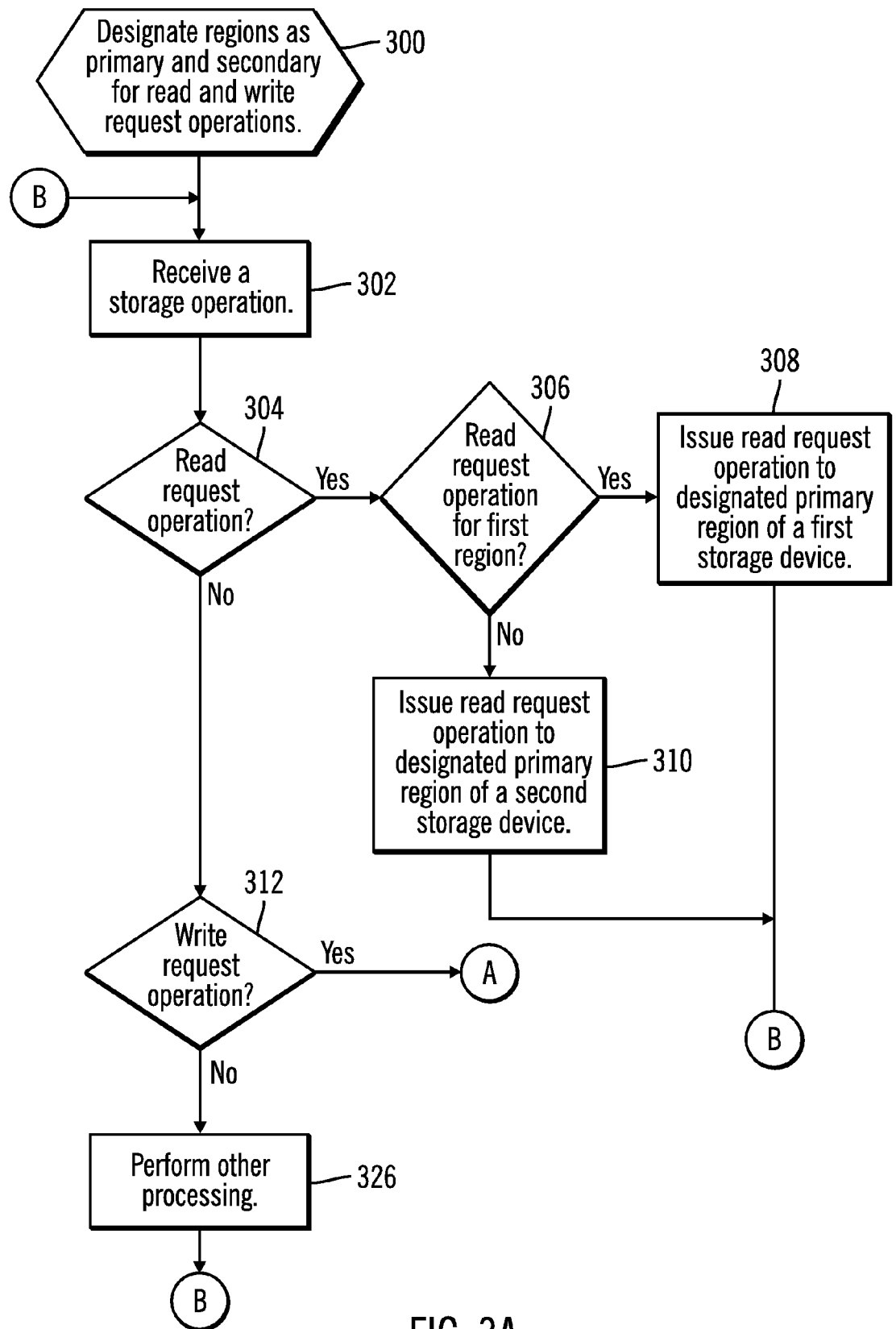
FIGS. 3A and 3B illustrate logic performed by the performance manager in accordance with certain embodiments.
Figure 3B:
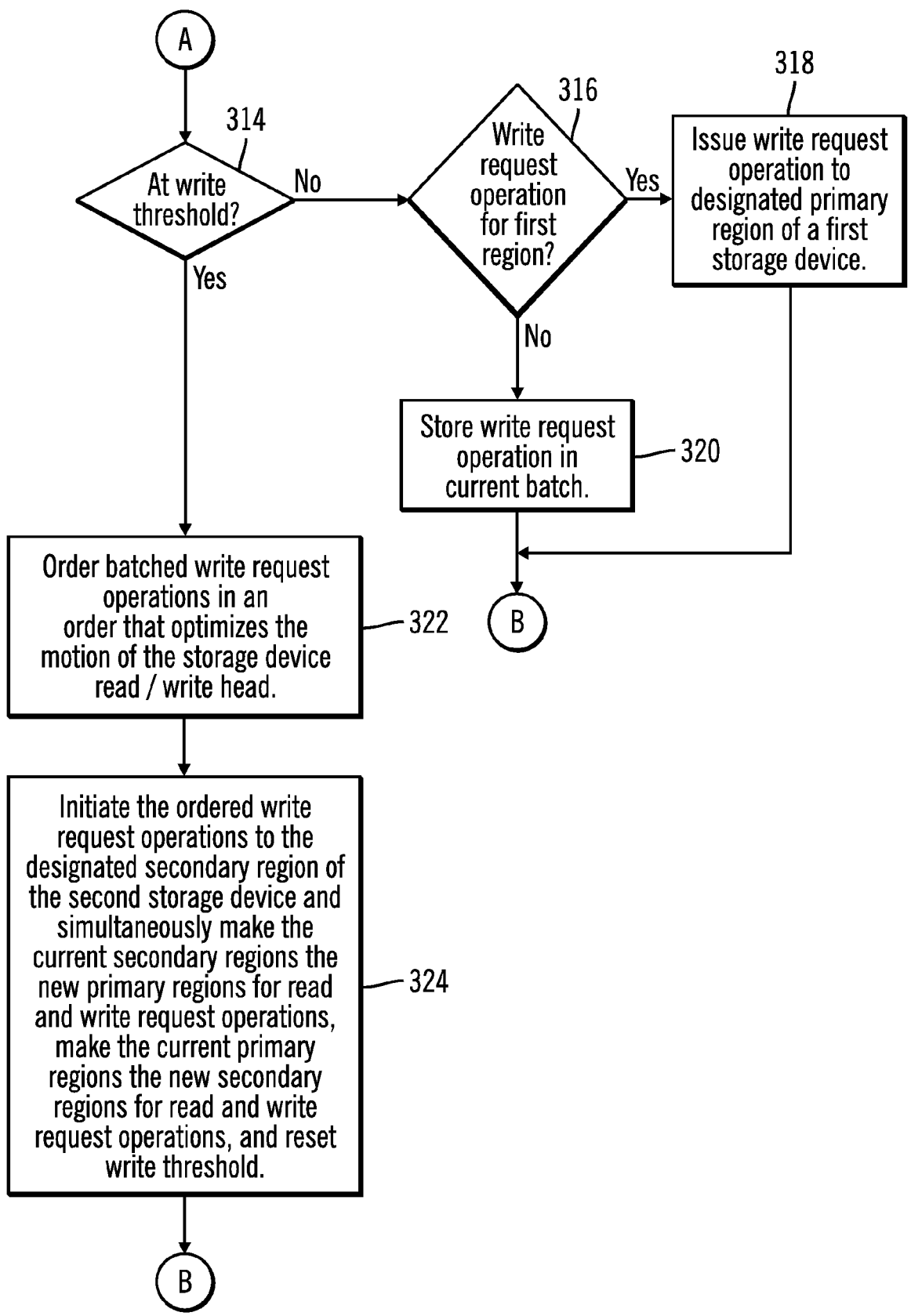

FIGS. 3A and 3B illustrate logic performed by the performance manager 130 in accordance with certain embodiments of the invention. Control beings at block 300 with the performance manager 130 designating regions as primary and secondary for read and write request operations for first and second storage devices. Each storage device has a first region and a second region. As an example, the first region of a first storage device may be a primary region for certain read and write request operations (e.g., those for LBAs from 0-(N/2−1)), while the second region of a second storage device may be the primary region for certain other read and write request operations (e.g., those for LBAs from N/2-N).

In block 302, the performance manager 130 receives a storage operation. In block 304, the performance manager 130 determines whether the storage operation is a read request operation. If so, processing continues to block 306, otherwise, processing continues to block 312. In block 306, the performance manager 130 determines whether the read request operation is for a first region (e.g., LBA region 0). If so, processing continues to block 308, otherwise, processing continues to block 310. In block 308, the performance manager 130 issues the read request operation to a designated primary region of a first storage device and processing loops back to block 302. In certain embodiments, issuing a read request operation or a write request operation includes storing the operation in an operation structure 140. In block 310, the performance manager 130 issues the read request operation to a designated primary region of a second storage device and processing loops back to block 302.

In block 312, the performance manager 130 determines whether the storage operation is a write request operation. If so, processing continues to block 314 (FIG. 3B), otherwise, processing continues to block 326. In block 326, the performance manager 130 performs other processing. From block 326, processing loops back to block 302.

In block 314, the performance manager 130 determines whether a write threshold has been reached. If so, processing continues to block 322, otherwise, processing continues to block 316.

In block 316, the performance manager 130 determines whether the write request operation is for the first region (e.g., LBA region 0). If so, processing continues to block 318, otherwise, processing continues to block 320. In block 318, the performance manager 130 issues the write request operation to a designated primary region of a first storage device and processing loops back to block 302 (FIG. 3A). In certain embodiments, the write request operation is issued with read request operations for the first region. In block 320, the performance manager 130 stores the write request operation in a current batch of write request operations that are for the second region (e.g., LBA region 1) and processing loops back to block 302 (FIG. 3A).

In block 322, since the write threshold has been reached, the performance manager 130 orders the batched write request operations in an order that optimizes the motion of the device read/write head (e.g., placing write request operations for sequential LBAs in a sequential order).

In block 324, the performance manager 130 initiates the ordered write request operations to the designated secondary region of the second storage device and simultaneously makes the current secondary regions the new primary regions for read and write request operations, makes the current primary regions the new secondary regions for read and write request operations, and resets the write threshold. For example, if HDD0 is initially the primary storage device, with primary LBA region 0 and HDD1 is initially the secondary storage device with primary LBA region 1, then, upon the write threshold being reached, HDD0 is the primary storage device with primary LBA region 1, and HDD0 is the secondary storage device with primary LBA region 0. Each storage device will have a "primary" and a "secondary" LBA region that is used to determine the division of I/O request operations. From block 324, processing loops back to block 302 (FIG. 3A).

Merely to enhance understanding of embodiments, an example is provided with reference to FIG. 2. At time T0, HDD0 LBA Region 0 is a primary region for reading RAID array LBAs from 0 to (N/2−1), while HDD1 LBA Region 1 is the primary region for reading RAID array LBAs from N/2 to N.

The write request operations targeted at the RAID array are managed by the performance manager 130 as follows: write request operations to RAID array LBAs 0 to N/2−1 are sent to HDD0 interleaved with the read request operations out of the operation queue, while write request operations to RAID array LBAs N/2 to N are sent to HDD1 interleaved with read request operations out of the queue. The write request operations to the RAID array targeted to array LBAs 0 to N/2−1 are held pending (e.g., placed in an write operation queue) to HDD1 and write request operations to the RAID array targeted to array LBAs N/2 to N are held pending to HDD0 until the write threshold is reached.

Once the write threshold is reached, a transition is initiated. The transition involves the following: at time T1, HDD0 LBA Region 1 becomes the primary region for reading RAID array LBAs from N/2 to N, and HDD1 LBA Region 0 becomes the primary region for reading RAID array LBAs from 0 to N/2−1. The performance manager 130 manages write request operations targeted at the RAID array as follows: write request operations to RAID array LBAs 0 to N/2−1 are sent to HDD1 interleaved with the read request operations out of the operation structure 140, and write request operations to RAID array LBAs N/2 to N are sent to HDD0 interleaved with read request operations out of the operation structure 140. The write request operations to the RAID array targeted to array LBAs 0 to N/2−1 are held pending to HDD0, and write request operations to the RAID array targeted to array LBAs N/2 to N are held pending to HDD1 until the write threshold is reached again. At time T1, the write threshold is also reset.

In certain embodiments, for mirrored RAID implementations management of read requests to specific storage devices based on array/storage device LBAs to control physical storage device head travel seek latencies, along with incorporation of write request operation management and bursting of writes is provided. In certain embodiments, management of the operation structure 140 and bursting of writes is managed in conjunction with read optimizations to control the physical storage device head travel and seek latencies.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or storage device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or storage device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory storage devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or storage devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3A and 3B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A and 3B may be implemented in software, hardware, programmable and non-programmable gate array logic or in some combination of hardware, software, or gate array logic.

Figure 4:
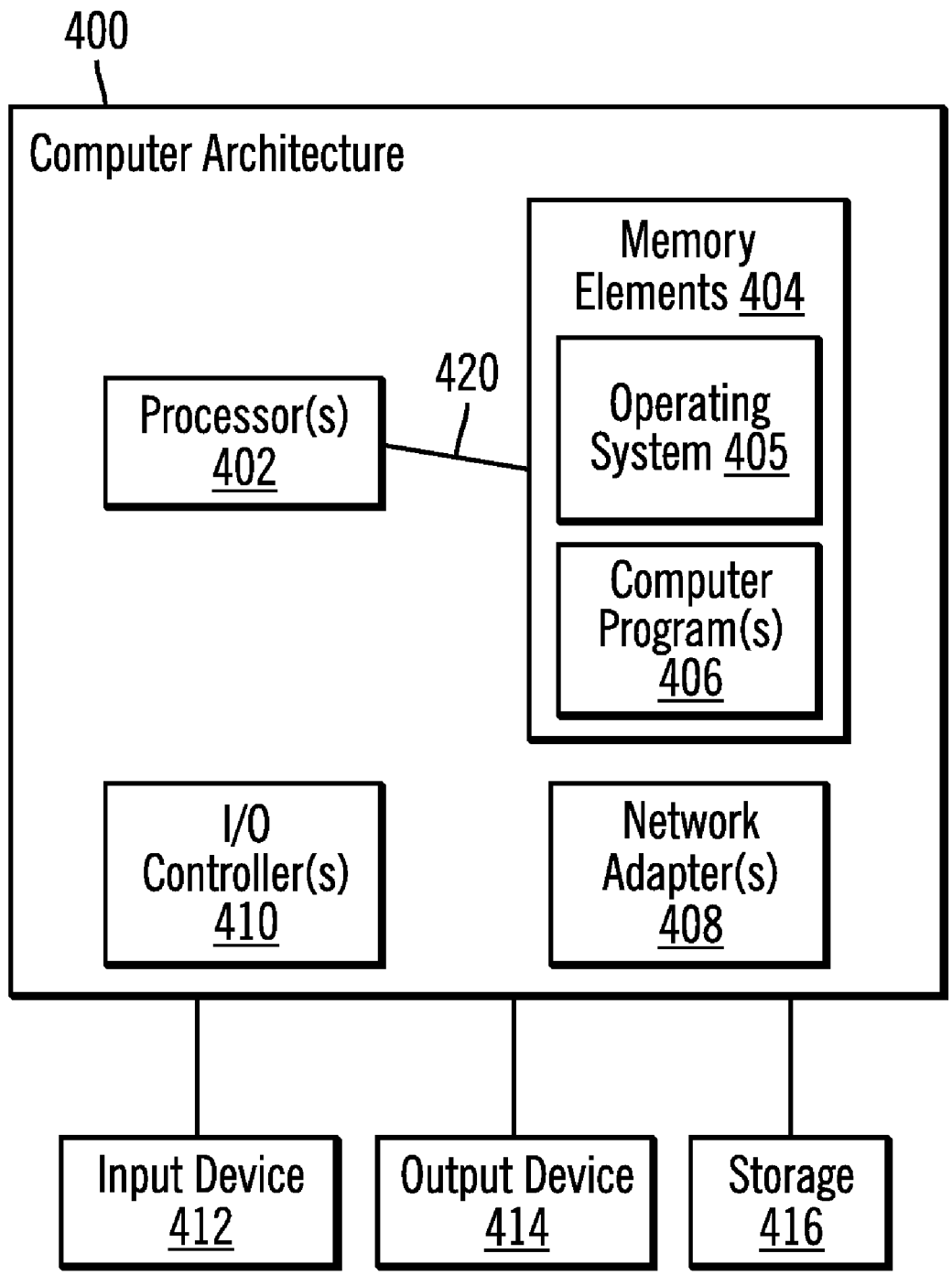
FIG. 4 illustrates a system architecture that may be used in accordance with certain embodiments.

FIG. 4 illustrates a system architecture 400 that may be used in accordance with certain embodiments. Client computer 100 and/or storage control unit 120 may implement system architecture 400. The system architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) storage devices 412, 414 (including but not limited to keyboards, displays, pointing storage devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The system architecture 400 may be coupled to storage 416 (e.g., a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The system architecture 400 may include fewer components than illustrated, additional components not illustrated herein, or some combination of the components illustrated and additional components. The system architecture 400 may comprise any computing storage device known in the art, such as a mainframe, server, personal computer, workstation, laptop, handheld computer, telephony storage device, network appliance, virtualization storage device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for processing read and write request operations, comprising:

designating a first region of a first storage device as primary region for read requests and write requests, wherein the first region of the first storage device includes Logical Block Addresses from zero to (N/2−1) and a second region of the first storage device includes Logical Block Addresses from N/2 to N;

designating a second region of a second storage device as a primary region for read requests and write requests, wherein a first region of the second storage device includes Logical Block Addresses from zero to (N/2−1) and the second region of the second storage device includes Logical Block Addresses from N/2 to N, wherein the first storage device and the second storage device maintain redundant copies of data;

receiving a write request operation;

determining whether a write threshold has been reached;

in response to determining that the write threshold has not been reached, determining whether the write request operation falls within the Logical Block Addresses from zero to (N/2−1) or within the Logical Block Addresses from (N/2) to N;

in response to determining that the write request operation falls within the Logical Block addresses from zero to (N/2−1), issuing the write request to the primary region of the first storage device; and in response to determining that the write request operation falls within the Logical Block addresses from N/2 to N, storing the write request in a current batch of write request operations that are for the primary region of the second storage device; and in response to determining that the write threshold has been reached, simultaneously issuing the current batch of write request operations to the primary region of the second storage device and switching the designations of regions of the first storage device and the second storage device, wherein the first region of the first storage device including Logical Block Addresses from zero to (N/2−1) is designated the secondary region and the second region of the first storage device including Logical Block Addresses from N/2 to N is designated the primary region, and wherein the first region of the second storage device including Logical Block Addresses from zero to (N/2−1) is designated the primary region and the second region of the second storage device with Logical Block Addresses from N/2 to N is designated the secondary region.

2. The method of claim 1, wherein read request operations falling within the Logical Block Addresses from zero to (N/2−1) are issued to a primary region of one storage device and read request operations falling within the Logical Block Addresses N/2 to N are issued to a primary region of another storage device depending on which regions of the first storage device and the second storage device are designated as primary regions for the Logical Block Addresses.

3. The method of claim 1, wherein additional write request operations for a primary region in one storage device are issued, while write request operations to a primary region of another storage device are stored in a batch depending on which regions of the first storage device and the second storage device are designated as primary regions.

4. The method of claim 3, further comprising:

ordering the batched write request operations in an order that optimizes motion of a storage device read/write head.

5. The method of claim 1, wherein switching the designations of regions of the first storage device and the second storage device further comprises:

switching the designation of each primary region to be a secondary region; and switching the designation of a secondary region to be a primary region.

6. A computer program product comprising a computer useable storage medium including a computer readable program, wherein the computer readable program when executed on a computer causes the computer to:

designate a first region of a first storage device as primary region for read requests and write requests, wherein the first region of the first storage device includes Logical Block Addresses from zero to (N/2−1) and a second region of the first storage device includes Logical Block Addresses from N/2 to N;

designate a second region of a second storage device as a primary region for read requests and write requests, wherein a first region of the second storage device includes Logical Block Addresses from zero to (N/2−1) and the second region of the second storage device includes Logical Block Addresses from N/2 to N, wherein the first storage device and the second storage device maintain redundant copies of data;

receive a write request operation;

determine whether a write threshold has been reached;

in response to determining that the write threshold has not been reached, determine whether the write request operation falls within the Logical Block Addresses from zero to (N/2−1) or within the Logical Block Addresses from (N/2) to N;

in response to determining that the write request operation falls within the Logical Block addresses from zero to (N/2−1), issue the write request to the primary region of the first storage device; and in response to determining that the write request operation falls within the Logical Block addresses from N/2 to N, store the write request in a current batch of write request operations that are for the primary region of the second storage device; and in response to determining that the write threshold has been reached, simultaneously issue the current batch of write request operations to the primary region of the second storage device and switch the designations of regions of the first storage device and the second storage device, wherein the first region of the first storage device including Logical Block Addresses from zero to (N/2−1) is designated the secondary region and the second region of the first storage device including Logical Block Addresses from N/2 to N is designated the primary region, and wherein the first region of the second storage device including Logical Block Addresses from zero to (N/2−1) is designated the primary region and the second region of the second storage device with Logical Block Addresses from N/2 to N is designated the secondary region.

7. The computer program product of claim 6, wherein read request operations falling within the Logical Block Addresses from zero to (N/2−1) are issued to a primary region of one storage device and read request operations falling within the Logical Block Addresses N/2 to N are issued to a primary region of another storage device depending on which regions of the first storage device and the second storage device are designated as primary regions for the Logical Block Addresses.

8. The computer program product of claim 6, wherein additional write request operations for a primary region in one storage device are issued, while write request operations to a primary region of another storage device are stored in a batch depending on which regions of the first storage device and the second storage device are designated as primary regions.

9. The computer program product of claim 8, further comprising:
ordering the batched write request operations in an order that optimizes motion of a storage device read/write head.

10. The computer program product of claim 6, wherein, when switching the designations of regions of the first storage device and the second storage device, the computer readable program when executed on a computer causes the computer to:
switch the designation of each primary region to be a secondary region; and
switch the designation of a secondary region to be a primary region.

11. A system for processing read and write request operations, comprising:
hardware logic capable of performing operations, the operations comprising:
designating a first region of a first storage device as primary region for read requests and write requests, wherein the first region of the first storage device includes Logical Block Addresses from zero to (N/2−1) and a second region of the first storage device includes Logical Block Addresses from N/2 to N;
designating a second region of a second storage device as a primary region for read requests and write requests, wherein a first region of the second storage device includes Logical Block Addresses from zero to (N/2−1) and the second region of the second storage device includes Logical Block Addresses from N/2 to N, wherein the first storage device and the second storage device maintain redundant copies of data;
receiving a write request operation;
determine whether a write threshold has been reached;
in response to determining that the write threshold has not been reached,
determining whether the write request operation falls within the Logical Block Addresses from zero to (N/2−1) or within the Logical Block Addresses from (N/2) to N;
in response to determining that the write request operation falls within the Logical Block addresses from zero to (N/2−1), issuing the write request to the primary region of the first storage device; and
in response to determining that the write request operation falls within the of Logical Block addresses from N/2 to N, storing the write request in a current batch of write request operations that are for the primary region of the second storage device; and
in response to determining that the write threshold has been reached, simultaneously issuing the current batch of write request operations to the primary region of the second storage device and switching the designations of regions of the first storage device and the second storage device, wherein the first region of the first storage device including Logical Block Addresses from zero to (N/2−1) is designated the secondary region and the second region of the first storage device including Logical Block Addresses from N/2 to N is designated the primary region, and wherein the first region of the second storage device including Logical Block Addresses from zero to (N/2−1) is designated the primary region and the second region of the second storage device with Logical Block Addresses from N/2 to N is designated the secondary region.

12. The system of claim 11, wherein read request operations falling within the Logical Block Addresses from zero to (N/2−1) are issued to a primary region of one storage device and read request operations falling within the Logical Block Addresses N/2 to N are issued to a primary region of another storage device depending on which regions of the first storage device and the second storage device are designated as primary regions for the Logical Block Addresses.

13. The system of claim 11, wherein additional write request operations for a primary region in one storage device are issued, while write request operations to a primary region of another storage device are stored in a batch depending on which regions of the first storage device and the second storage device are designated as primary regions.

14. The system of claim 13, further comprising:
ordering the batched write request operations in an order that optimizes motion of a storage device read/write head.

15. The system of claim 11, wherein, when switching the designations of regions of the first storage device and the second storage device, the operations further comprise:
switching the designation of each primary region to be a secondary region; and
switching the designation of a secondary region to be a primary region.

* * * * *